April 17, 1962 R. F. MOORE ETAL 3,029,469
LEAK DETECTING DEVICE FOR TIRE VULCANIZATION PRESS
Filed March 30, 1960 2 Sheets-Sheet 1

INVENTOR.
RALPH F. MOORE
CHESTER E. BLUMENAUER
RICHARD J. LIPSKI
BY Jack Posin
ATTORNEY.

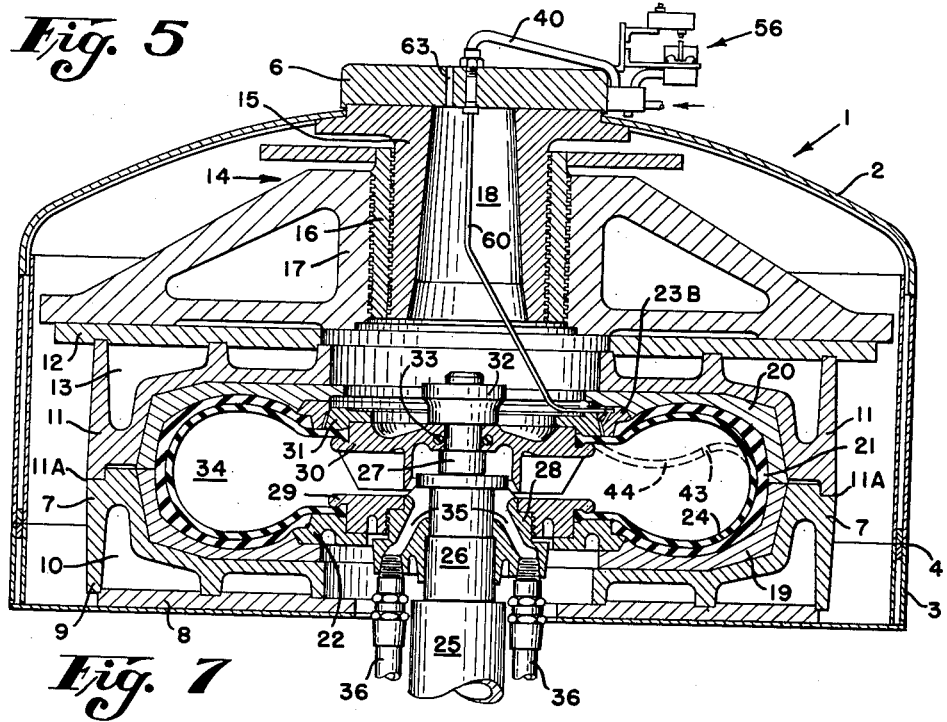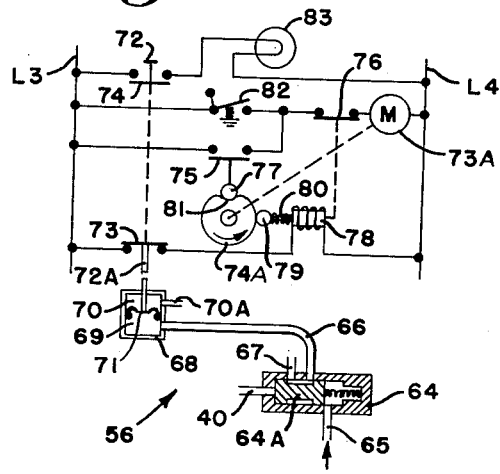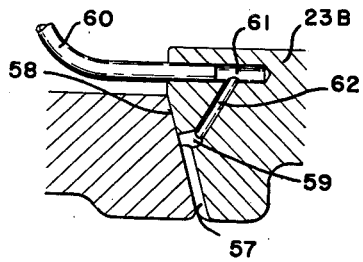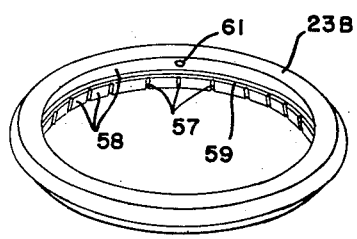

United States Patent Office 3,029,469
Patented Apr. 17, 1962

3,029,469
LEAK DETECTING DEVICE FOR TIRE
VULCANIZATION PRESS
Ralph F. Moore, South Hadley Falls, and Chester E. Blumenauer, Springfield, Mass., and Richard J. Lipski, Detroit, Mich., assignors to United States Rubber Company, New York, N.Y., a corporation of New Jersey
Filed Mar. 30, 1960, Ser. No. 18,541
10 Claims. (Cl. 18—17)

This invention relates to improvements in automatic presses for the shaping and vulcanizing of pneumatic tires and, more particularly, to means for detecting the presence of detrimental steam leaks in such presses.

Presses of this type are utilized in the processing of uncured barrel-shaped tire carcasses into cured, donut-shaped finished tires and may be characterized by the following description of operation. An uncured carcass is placed between a steam jacketed stationary lower mold section, a steam jacketed vertically movable upper mold section, and a steam inflatable cylindrically shaped flexible diaphragm or bag which is vertically disposed in concentricity with both of the mold sections and the tire carcass. With the carcass in position, the press automatically and concurrently lowers the upper mold section, lowers the upper edge of the diaphragm, and injects steam under pressure into the diaphragm to press the tire carcass firmly against the mold sections, thereby both shaping and vulcanizing the tire. The tire carcass is retained in the heated mold sections for the requisite time period necessary to achieve vulcanization and, upon completion of the vulcanization period, the steam pressure is removed from the diaphragm interior and the upper mold section is raised to allow removal of the cured tire.

Operating in conjunction with presses of the foregoing type, conveyors, carcass positioners, and tire removers are employed to automatically transport the tire carcasses to the presses, locate the carcasses on the presses, remove the cured tires after cycling of the presses, and convey the cured tires to an inspection station. Thus, from the time that barrel-shaped carcasses are placed on the conveyors at the point where they are fabricated, until the shaped and vulcanized tires are inspected at the inspection station, the processing of the tires is almost completely automatic. Should a malfunction of a type which allows defective tires to be produced occur in one of the presses of a multiple press installation, a number of imperfect tires may be turned out by that press before the defect can be discovered and traced back to the press which is responsible.

One type of malfunction which has proven to be particularly troublesome in this regard emanates from the failure of a press to develop sufficient pressure within the flexible diaphragm, due to steam leakage, to properly shape the tire. Another recurrent imperfection arises due to the fact that the diaphragms often develop a tear or opening that allows the steam to penetrate the ply fabric of a tire, which, in turn, usually results in a scrapped tire because of ply separation within the tire.

In view of the fact that a press, which either fails to develop sufficient pressure due to steam leakage about the diaphragm, or has a leaky diaphragm allowing steam to pass therethrough to reach the ply fabric, may produce a series of consecutively defective tires, it is a primary objective of this invention to provide leak detecting means which will insure that a warning signal is given when such leaks are initiated.

Another objective of this invention is to provide means for stopping the defective press at the end of its vulcanization period should the leak detecting means have been actuated during the cycle of operation of the press.

Further objects and advantages of this invention will become apparent as the following description proceeds.

Briefly stated, in accordance with one embodiment of this invention, either a thermal or a pressure actuated switch is utilized to provide a warning signal of a malfunction, and a conduit means, which is positioned to receive leakage steam from within the press, is employed to conduct the leakage steam to the switch for causing actuation of the switch. Upon actuation of the switch, the warning signal, which may be visual, audible, or of a type that interrupts operation of the press, is initiated to inform an operator of the malfunction.

While the specification concludes with claims particularly pointing out and distinctly claiming the subject matter of this invention, it is believed that the invention will be better understood from the following description taken in connection with the accompanying drawings in which:

FIG. 4 is a perspective view of a tire bead positioning ring which has been modified in accordance with this invention;

FIG. 5 is a sectional view of a modified form of leak detecting device which responds only to leaks which develop in the steam inflatable diaphragm;

FIG. 6 is an enlarged view of a portion of FIG. 5 showing the grooves and channels of the tire bead positioning ring in greater detail; and FIG. 7 is a schematic diagram showing an alternative arrangement by which the press may be controlled by the leak detecting device of this invention.

Figure 1:
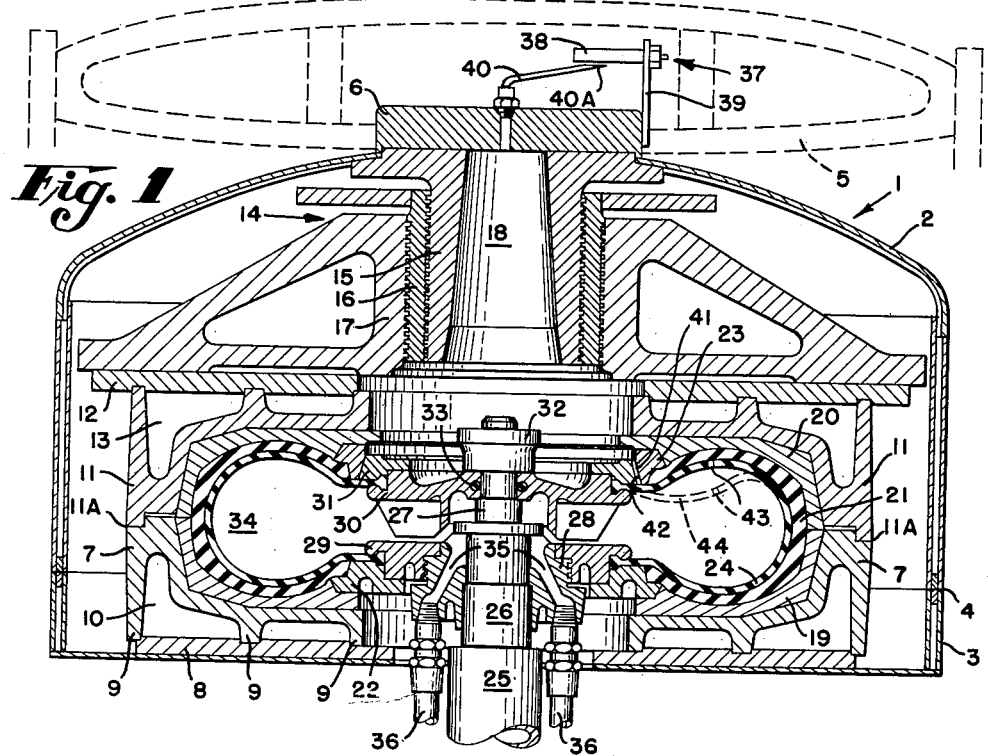
FIG. 1 is a sectional view of the tire shaping and vulcanizing portion of a press having one form of leak detecting device of this invention.

Referring to FIG. 1, there has been illustrated the tire shaping and vulcanizing portion of a pneumatic tire vulcanization press, as indicated generally at 1. The press shown herein is a single press unit having a pair of mold sections mounted therein and the description will be primarily directed to such a unit; however, the invention may be utilized with dual press units or multiple press units and, therefore, it is not intended to limit the inventtion to a single press arrangement.

The press illustrated is of a well known type utilized in the rubber industry such as, for example, the presses shown in United States Patents Nos. 2,495,664 and 2,808,618. The foregoing patents describe mechanism by which the upper mold sections may be initially raised along a vertical plane to clear the tire being processed, and then pivoted about a horizontal axis to allow complete opening of the press. Such arrangements for opening the press may be utilized with the press shown herein.

The press 1 comprises an upper casing or dome 2 and a lower casing 3, which together form a steam tight seal at 4 when the press is closed. The dome 2 is moved through both its linear vertical motion and its pivoted motion by means of a crossbar 5, shown in phantom, and a toggle mechanism (not shown). The dome is supported from the crossbar 5 by means of a top plate 6 which also supports the equipment located within the dome.

The press that has been illustrated is of the steam jacketed mold section type; however, this is not essential as platen type molds may also be used. The lower or stationary mold section is indicated at 7 and it is mounted on a support plate 8, which, in turn, is carried by the stationary lower casing 3. The lower mold section 7 and support plate 8 are maintained in spaced apart relation by a plurality of ribs 9 to provide a steam jacket chamber 10 about the lower mold section. Passages (not shown) are provided through the support plate 8 through which steam may circulate to heat the lower mold section during operation of the press.

An upper or movable mold section 11 is bolted or otherwise mounted upon an upper support plate 12 to form a steam jacket 13 therebetween in a manner similar to the steam jacket of the lower mold section. The upper support plate 12 is movably suspended from the top plate 6 by means of a double screw-threaded connection, indicated generally at 14, which is adjustable in order to compensate for the use of different sizes of molds in the press.

The double screw-threaded connection 14 includes an annular threaded inner member 15, which is supported from the top plate 6 by a steam tight connection, an annular center member 16 having its inner and outer surfaces oppositely threaded, and an annular outer member 17 having its inner surface threaded to mate with the threads on the outer surface of annular member 16. As is apparent from an inspection of FIG. 1, the upper support plate 12 is rigidly fastened to the lower surface of the outer threaded member 17 so that a centrally disposed chamber, shown generally at 18, is formed within the dome 2.

The mold sections 7 and 11 each carry an opposed mold half 19 and 20, respectively, the inner surface of each of which has formed thereon a pattern that it is desired to have duplicated on the tire 21. Tire bead positioning rings 22 and 23 cooperate with mold halves 19 and 20, respectively to both initially locate the tire and and later provide a continuous surface against which the tire may be pressed. Ring 23 is rigidly supported in position with respect to upper mold half 20, whereas ring 22 is movably supported in position with respect to lower mold half 19 in a manner to be more fully described hereinafter.

In order to properly shape the tire 21 against the mold halves 19 and 20, an inflatable diaphragm 24 of heavy rubber or rubber-like material is utilized. A plurality of centrally disposed telescopic shafts 25, 26 and 27 are employed to support both the diaphragm 24 and the lower tire bead positioning ring 22. Ring 22, in addition to positioning the lower tire bead, serves as a support for one edge of the inflatable diaphragm 24 and is in turn supported from a central casting 28 that is carried by the center telescopic shaft 26. A plurality of radial spokes (not shown) serve to connect the lower bead positioning ring 22 to the central casting 28. The lower edge of the diaphragm 24 is sealed with respect to the lower tire bead positioning ring 22 by means of a lower diaphragm clamping ring 29, which is threadedly carried by the central casting 28 in order to facilitate removal of the diaphragm in the event of failure. The upper edge of the diaphragm 24 is supported by a diaphragm supporting ring 30 that is carried by the inner telescopic shaft 27, and a diaphragm clamping ring 31 is bolted or otherwise removably secured to the diaphragm supporting ring 30 to seal the upper end of the diaphragm 24. A lock nut 32 clamps the diaphragm supporting ring 30 to the inner telescopic shaft 27, and an O ring seal 33 is utilized to prevent the leakage of steam between the diaphragm supporting ring 30 and shaft 27.

The arrangement of the diaphragm 24 and its supporting structure is such as to form an expansible chamber, indicated generally at 34 into which steam under pressure is supplied to effect shaping of the tire 21 and by which a portion of the heat necessary for vulcanization is applied to the tire. Steam is applied into expansible chamber 34 through conduits 35 formed in the central casting 28 and it is brought to these conduits from a source (not shown) through flexible tubes 36.

In conventional operation of pneumatic tire vulcanization presses, the start of a cycle of operation occurs when the dome 2 has been raised vertically and then rocked into its wide open position. At this point the inner telescopic shaft 27 is also vertically raised and no pressure exists within the expansible chamber 34 so that the flexible diaphragm 24 is vertically extended to a cylindrical shape. Similarly, the center telescopic shaft 26, which carries the tire bead positioning ring 22, will have been raised slightly at the completion of the previous cycle to strip the previously completed tire from the lower mold half 19 so that the lower tire bead positioning ring 22 is raised slightly above the lower mold half 19.

With the foregoing arrangement of components the press is in position to receive a new tire carcass to be cured. The new tire carcass is positioned concentrically with the cylindrical diaphragm 24 and dropped down into the press so that its lower bead or toe section engages the lower tire bead positioning ring 22. The dome portion of the press is then lowered until the upper tire bead positioning ring 23 engages the upper tire bead and, concurrently, engages the outer surface of upper diaphragm clamping ring 31. At this point the entire assembly shifts vertically downwardly until the lower bead positioning ring 22 seats with the lower mold half 19 at which time center telescopic shaft 26 stops its downward movement while the inner telescopic shaft 27 and upper dome portion 2 continue their downward movement. Concurrently with the downward movement of the dome portion 2 and the inner telescopic shaft 27, steam is admitted into the expansible chamber 34 to inflate the diaphragm 24, thereby causing the tire 21 to be expanded outwardly against the mold halves 19 and 20. It may be noted that the final movement of the upper mold section 11 towards the lower mold section 7 results in a seal being effected about the periphery of the juncture of the two mold sections as shown at 11A. The seal 11A assists the mold sections 7 and 11 in supporting the tire against the pressure exerted within the expansible chamber 34.

After the requisite period of time necessary to achieve the vulcanization of the tire has passed, the sequence of events by which the tire is removed from the mold sections is as follows. First, the pressure within the expansible chamber 34 is reduced. Next, the dome portion 2 commences to raise and carries therewith the upper mold section 11. The initial movement of the upper mold section 11 serves to break the cured tire 21 from the upper mold half 20 and, further, allows the diaphragm 24 to be broken free from the upper inner surface of the tire 21. The upper mold section then continues to raise vertically and, at the same time, the inner telescopic shaft 27 raises vertically to strip the diaphragm 24 from the interior of the tire 21. When the diaphragm has been stripped from the tire and is again cylindrical in shape, the center telescopic shaft 26 begins to raise, carrying the lower positioning ring 22 along with it. This, in turn, causes the tire 21 to be stripped from the lower mold half 19 and raises the tire free from the mold. By this time the dome portion 2 has opened to its wide open position, the tire may be removed from the press, and the machine is ready to be reloaded for a new cycle. Mold blowout means (not shown) may be utilized during the stripping of the tire from the mold section to clean out the mold halves preparatory to the insertion of a new tire into the press.

As indicated earlier in this specification, should a serious loss of steam pressure within the expansible chamber 34 develop, the tire would not properly be shaped within the mold halves 19 and 20 and, therefore, would have to be rejected or scrapped. The most common cause of reduced pressure within the expansible chamber 34 is the leakage of steam past the O ring seal 33 and into the centrally disposed chamber 18. In the usual prior art machine, the chamber 18 is open to the atmosphere and, therefore, the steam leakage into this chamber may result in a serious pressure drop in expansible chamber 34.

In order to insure that excessive leakage of steam past the O ring 33 will not go undetected, sensing means, as shown generally at 37, are provided. The sensing means 37 includes a thermally actuated switch 38, which is supported from the top plate 6 by means of a bracket 39, and conduit means 40, open at one end to the interior of chamber 18 and having its other end positioned to direct leakage steam against the thermally actuated switch 38 so that the switch will be actuated when steam leaks by the O ring 33. It is apparent that the positioning of the end of conduit means 40 adjacent to the thermally actuated switch 38 may be varied to achieve a degree of control over the amount of leakage necessary to actuate switch 38. Thus, by positioning the end 40A of conduit means 40 closely adjacent to the switch 38, a relatively small amount of leakage will be sufficient to actuate the switch. Similarly, by positioning the conduit end 40A relatively farther away from the thermally actuated switch 38 a greater amount of leakage past the O ring 33 will be necessary to actuate the thermally actuated switch 38.

In order, further, to insure that leaks through tears or openings in the diaphragm 24 will be detected by the thermally actuated switch 38, the upper tire bead positioning ring 23 is provided with a plurality of grooves 41 which extend across its inner surface in a generally vertical direction to provide a conduit 42 between the adjoining surfaces of tire bead positioning ring 23 and diaphragm clamping ring 31. The grooves 41 may be circumferentially spaced about the inner periphery of tire bead positioning ring 23 in order to allow leakage steam originating from various points about the periphery of the diaphragm 24 to reach the chamber 18 and yet, allow tire bead positioning ring 23 to maintain surface engagement with diaphragm clamping ring 31 during normal operation of the press.

Assuming that diaphragm 24 has a hole or aperture 43 therethrough, it will be apparent that, during the period of time when pressure is applied to expansible chamber 34, a small amount of steam and moisture condensation will leak through the diaphragm at aperture 43 to contact the inner surface of the tire 21. Similarly, when the steam pressure in expansible chamber 34 is reduced at the end of the pressure cycle, the steam trapped between the diaphragm 24 and tire 21 will expand, thereby causing the diaphragm to collapse as shown in dotted lines at 44 on FIG. 1. With the collapsing of diaphragm 24, conduits 42 in the tire bead positioning ring 23 will then have their lower ends open to receive the leakage steam from the space between the collapsed diaphragm 24 and the tire 21. The leakage steam then passes through conduits 42 and into the chamber 18 from which it flows through conduit means 40 to the thermally actuated switch 38. It is apparent that when the sensing means 37 is utilized to indicate a leaky diaphragm, the end 40A of conduit means 40 must be positioned closely adjacent to the thermally actuated switch 38 so that the small amount of leakage through the diaphragm 24 may actuate the thermal switch 38.

Figure 2:
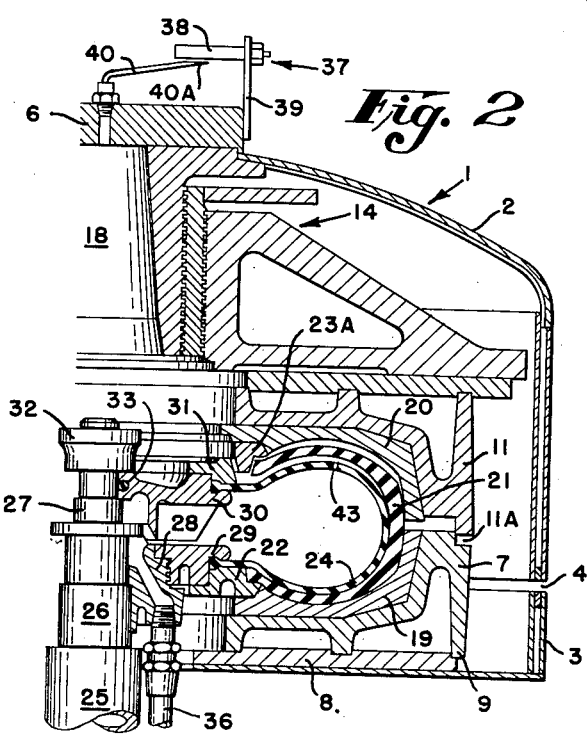
FIG. 2 is a partial sectional view of a modification of the device of FIG. 1 wherein actuation of the leak detecting device due to a leaky diaphragm occurs when the press begins to open.

In the embodiment of FIG. 2, the tire bead positioning ring 23A is of a conventional type and does not include the grooved conduits 42 of FIG. 1. In order to detect leakage through an aperture 43 in the diaphragm 24, the leakage steam is retained between the diaphragm 24 and tire 21 until the upper mold section 11 begins to raise with the opening of the press. At this point the seal between the surface of tire bead positioning ring 23A and diaphragm clamping ring 31 opens and the leakage steam may enter chamber 18 to be directed at the sensing means 37. In this embodiment, the seal 11A formed between the inter-engaging surfaces of upper and lower mold sections 7 and 11 is retained during the initial upward movement of the mold section in order to prevent the leakage steam from passing around the outer surface of the tire 21 and out to the atmosphere from between the two mold sections. Thus, in both the embodiments of FIG. 1 and FIG. 2, leakage steam which originates either by leakage around the O ring seals 33 or by leakage through the aperture 43 in the diaphragm 24 will actuate the sensing means 37.

Figure 3:
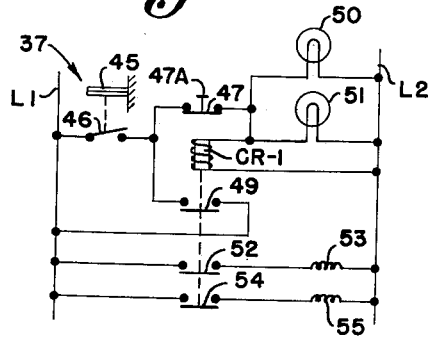
FIG. 3 is an electrical schematic wiring diagram showing one circuit arrangement by which the leak detecting device may actuate a warning signal to stop the cycle of operation of the press.

Referring now to FIG. 3, one form of circuit arrangement has been illustrated for providing a warning signal when the sensing means 37 becomes actuated. In this arrangement, the sensing means 37 includes a bimetallic element 45 that is operatively connected to move a set of normally open contacts 46, which close when the bimetal element 45 bends upon application of heat thereto by the leakage steam. Control voltage is applied to the warning circuit by means of control voltage leads L1 and L2 which may, for example, comprise a 110 volt A.C. power circuit. The closing of contacts 46, upon actuation of the sensing means 37, results in the energization of a control relay CR-1 through normally closed contacts 47 of a reset push button switch 47A. Upon energization of control relay CR-1, its contacts 49 pick up, thereby providing an alternate source of energization for the relay CR-1 that by-passes contacts 46 of the sensing means 37. Thus, regardless of whether or not the bimetal 45 cools off to later open contacts 46, once the sensing means 37 has been actuated, control relay CR-1 will pick up and remain energized until the reset push button switch 47A is depressed. Concurrently with the energization of control relay CR-1, lamps 50 and 51, which are connected in parallel with control relay CR-1, are energized to provide a visual indication that the control relay has picked up. Lamp 50 may be positioned on a control panel (not shown) at the press and lamp 51 may be remotely positioned at a central operating panel (not shown) wherein the condition of a whole bank of presses may be watched by a single observer.

Control relay CR-1 is provided with an additional set of contacts 52 which, upon closing with the energization of the control relay, causes a stop cycle solenoid 53 to be energized. Stop cycle solenoid 53, in turn, may be operatively connected into the control system (not shown) of the vulcanization press to stop the operating cycle thereof at a predetermined point, for example, when the press is in its wide open position. A third set of contacts 54 are also closed upon energization of control relay CR-1 and, in turn, energize a stop mold blow-out solenoid 55 which may, in turn, control a valve (not shown) that prevents air pressure from being applied to the mold halves at the end of the press operating cycle.

Referring now to FIGS. 4, 5, and 6 there is shown a third embodiment of this invention. In this embodiment a further modified tire bead retaining ring 23B is employed. Additionally, pressure sensing means, shown generally at 56, is utilized rather than the thermally actuated sensing means 37 of FIGS. 1 and 2. This embodiment may be used where it is desired to provide a warning signal which is actuated only by leakage which occurs through an opening or tear 43 in the diaphragm 24. The tire bead positioning ring 23B of FIGS. 4 through 6 is provided with a plurality of generally vertically disposed grooves 57 which extend longitudinally along a portion of the inner surface 58 of the ring 23B. The upper ends of each of the grooves 57 are joined together by a circumferentially extending annular channel 59 that is formed on the surface 58. The upper portion of the inner surface 58 is unbroken and seats against the outer peripheral surface of the upper diaphragm clamping ring 31 to form a seal between the chamber 18 and the space between the diaphragm 24 and the inner surface of the tire 21. Conduit means 40 is extended by the addition of a tube 60 which protrudes downwardly from the top plate 6 and connects into an aperture 61 formed in the tire bead retaining ring 23B. A channel 62 connects the aperture 61 with the annular channel 59 so that a conduit for leakage steam is provided which extends from adjacent the diaphragm 24 to the sensing means 56.

Thus, should diaphragm 24 develop a hole 43 and leakage steam enter the space between the diaphragm 24 and the tire 21, when the automatic controls of the press lower the steam pressure within the diaphragm chamber 34, the leakage steam will cause the diaphragm to collapse, thereby allowing the leakage steam to proceed through grooves 57, channel 59, channel 62, aperture 61, tubing 60, conduit means 40, to the pressure actuated sensing means 56. A bleed hole 63 is provided in top plate 6 to allow any steam which may leak by the O ring seal 33 to bleed to the atmosphere, thereby preventing this leakage steam from actuating the sensing means 56 when the press begins to open. The pressure actuated sensing means 56 in this embodiment, therefore, is selectively actuated solely by leakage steam which leaks through the diaphragm 24, and is not responsive to leakage steam which leaks by the O ring seal 33.

It will be apparent to those skilled in the art that by providing an additional conduit at the bleed hole 63 to receive O ring leakage steam therefrom and by utilizing the sensing means 37 of FIG. 1 in conjunction with the additional conduit, a warning arrangement may be achieved which not only will be actuated by either O ring steam leakage or diaphragm steam leakage but also will selectively indicate which of the two sources of leakage is responsible.

Referring now to FIG. 7, there has been illustrated in greater detail the pressure actuated sensing means 56 of the embodiment of FIG. 5 and, additionally, a schematic control arrangement by which the cycle of operation of the press may be stopped at a predetermined point. Pressure actuated sensing means 56 includes a valve body 64 having a spring biased pilot valve 64A which, in the absence of leakage steam pressure in conduit 40, is urged to its left-hand position. In this position, a pressurized line 65, which receives pressurized fluid from a source (not shown), is blocked by the pilot valve 64A and a conduit 66 is opened to the atmosphere through a bleed line 67. A pressure operated actuator 68 is provided which has a pressure retaining chamber 69 that is separated from an atmospheric pressure chamber 70 by a diaphragm 71. Pressure retaining chamber 69 is connected to one end of the conduit 66 while atmospheric chamber 70 is connected to atmosphere by a bleed line 70A. Actuator 68 may be of the snap action type which will remain in either its actuated or deactuated condition after being either actuated or reset. In the position shown, the actuaor 68 is in its deactuated condition, having been previously reset by depression of a reset push button 72 which is carried by a micro-switch 72A. Should a steam leak develop through the diaphragm 24 of FIG. 5, leakage pressure in conduit 40 will develop and move the pilot valve 64A to the right, thereby connecting conduit 66 to the pressurized line 65. This, in turn, will cause actuator 68 to raise it to its actuated condition wherein it actuates microswitch 72A. The actuation of switch 72A results in the opening of its contacts 73 and in the closing of its contacts 74, which, in turn, are connected in a control circuit for the press.

The control circuit for the press includes a pair of control voltage leads L3 and L4 which may, for example, comprise a 110 volt A.C. power supply circuit. A timer motor 73A, which drives a cam 74A, is connected across the control voltage leads L3 and L4 through a pair of contacts 75 and 76. Contacts 75 are controlled by a cam follower 77 and contacts 76 are under the control of both a relay 78 and a cam follower 79. Both of the cam followers 77 and 79 cooperate with the cam 74A but are positioned at different points about its periphery. Cam follower 79 is spring biased by a spring 80 into engagement with the surface of cam 74A during those times when the relay 78 is de-energized; however, when relay 78 becomes energized, it prevents the cam follower 79 from following depressions in the surface of cam 74A and causes contact 76 to remain closed during rotation of the cam. The connection between cam follower 79 and contacts 76 is a mechanical one and is such that when relay 78 is de-energized and cam follower 79 engages the raised surface of cam 74A the contacts 76 remain closed. However, when cam follower 79 enters the depression 81 on the surface of cam 74A while the relay 78 is de-energized, the contact 76 will open, breaking the control voltage circuit to timer motor 73A. A set of contacts 82 are provided in parallel with the contacts 75 in the control voltage line to the timer motor 73A. This set of contacts may be closed by a limit switch that is actuated at the end of a press cycle of operation at a time when a cured tire has been removed from the mold and a new tire carcass supplied to the mold. Thus, when the timer cycle ends due to cam follower 77 dropping into the depression 81 of the cam 74A the timer motor will stop pending completion of the unloading and reloading operation at which time contacts 82 will close to commence a new cycle of operation of the timer motor 73A.

Resuming a consideration of the effect of sensing means 56 on the control circuit due to the presence of leakage steam, it will be apparent that when actuator 68 is raised, thereby opening contacts 73 and closing contacts 74, relay 78 will become de-energized, thereby allowing its cam follower 79 to follow the contour of the surface of cam 74A. When the depression 81 on cam 74A reaches cam follower 79 and the cam follower 79 descends into the depression, contacts 76 will open, thereby removing power from the timer motor 73A to stop the motor at that time. The depression 81 may be set with respect to the cam follower 79 so that the timer motor 73A stops the press cycle of operation at a point where the dome portion 2 (FIG. 5) is at its wide open position just before removal of the cured tire. When the press remains stopped in its wide open position with a cured tire therein, an operator will notice that the press is stopped and investigate the cause. Similarly, a lamp 83 is provided across the control voltage leads L3 and L4 and, upon the closing of contacts 74, it becomes energized to further inform the operator that a press has stopped due to the fact that a diaphragm is leaking.

It is apparent from the foregoing discussion that, when an automatic shaping and vulcanizing press is equipped with the leak detecting and warning devices herein described, the likelihood of producing more than one defective tire from a leaky press is greatly diminished. This is particularly true when the warning device includes means that will stop the press at the end of a cycle of operation as described above.

While particular embodiments of this invention have been shown and described, it will be obvious to those skilled in the art that various changes and modifications may be made without departing from this invention in its broader aspect, and it is, therefore, aimed in the appended claims to cover all such changes and modifications as fall within the true spirit and scope of this invention.

Having thus described our invention, what we claim and desire to protect by Letters Patent is:

1. In a tire vulcanization press having first and second opposed mold sections in which the shape of a tire is changed from a cylinder to a toroid during the closing of the mold sections and wherein an expansible chamber forming flexible diaphragm expands within the tire under the action of fluid pressure to press the tire against the mold sections, diaphragm clamping means for clamping the diaphragm in position between the two mold sections, tire bead positioning means carried by each of the mold sections for positioning the tire with respect to both of the mold sections and the diaphragm, switch means operable when actuated to initiate a warning signal, a passageway in the press extending to one of said mold sections for transferring leakage fluid from said expansible chamber, and conduit means having one end terminating adjacent said passageway and being open thereat to receive leakage fluid from said expansible chamber, the other end of said conduit means being positioned such that leakage fluid is conveyed to said switch means and actuates said switch means to thereby initiate a warning signal upon leakage of a predetermined amount of fluid from the expansible chamber.

2. The combination of claim 1 wherein said one end of said conduit means only receives leakage fluid which passes through the flexible diaphragm.

3. The combination of claim 2 wherein said passageway includes passages that are at least in part formed in one of said tire bead positioning means.

4. The combination of claim 3 wherein said passages include grooves formed on a surface of one of said tire bead positioning means.

5. The combination of claim 1 wherein said warning signal is effective to stop the operation of the tire vulcanization press.

6. In a fluid-operated tire vulcanizing press having an operating cycle wherein a fluid-inflatable diaphragm which forms an expansible chamber is utilized in conjunction with opposed heated molds to shape and cure a pneumatic tire positioned between the inflatable diaphragm and the molds, the improvement comprising leakage fluid-transfer means communicating with said chamber when a leak occurs in said chamber, and sensing means communicating with said fluid-transfer means and responsive to leakage fluid from said expansible chamber during the shaping and curing of said tire and actuated by said leakage fluid for indicating a malfunction of the press.

7. The improvement of claim 6 wherein the indication of press malfunction is provided by circuit means responsive to actuation of said sensing means for interrupting the operating cycle of said tire vulcanizing press.

8. The improvement of claim 6 wherein said sensing means includes: switch means connected in a circuit for indicating the malfunction of the press, and conduit means having one end positioned to receive leakage fluid from between said diaphragm and said tire and having its other end positioned so that the leakage fluid will be directed to said switch means.

9. In a tire vulcanization press, a lower casing; an upper casing vertically movable with respect to said lower casing and cooperable therewith when closed to form an enclosure; an upper mold section positioned within said upper casing and movable therewith; a lower mold section positioned within said lower casing and carried thereby; a first telescopic shaft positioned centrally of said lower mold section and movable with respect thereto; a second telescopic shaft longitudinally movable within said first shaft and extending above said first shaft; a cylindrical diaphragm having upper and lower edges; means to connect said lower edge to said first shaft; a diaphragm clamping ring for clamping said upper edge of said second shaft, said diaphragm and said first and second shafts cooperating to form an expansible chamber adapted to receive steam therein to shape a tire positioned between the diaphragm and the mold sections when the casings are closed; a bead positioning ring carried by said first mold section for positioning a tire with respect thereto, said bead positioning ring having a surface engageable with a surface on said diaphragm clamping ring, one of said surfaces including a plurality of grooves thereon in communication with the space between the diaphragm and the upper mold section; switch means responsive to and actuated by leakage steam for providing a warning signal; and conduit means in communication with said grooves and with said switch means for conducting steam that leaks through said diaphragm to said switch means to thereby actuate the switch means and initiate the warning signal.

10. The combination of claim 9 wherein said grooves are formed on a surface of said bead positioning ring and extend only partially therealong, the remainder of said surface sealingly engaging the surface of said diaphragm clamping ring to contain steam leakage through said diaphragm in the space between the diaphragm and the upper mold section, said conduit means includes a conduit extending between said switch means and said bead positioning ring, and said bead positioning ring is provided with a passageway therein connecting said conduit with said grooves so that the contained leakage steam may flow to the switch means.

References Cited in the file of this patent
UNITED STATES PATENTS
2,145,997 Smith _____ Feb. 7, 1939

UNITED STATES PATENT OFFICE
CERTIFICATE OF CORRECTION

Patent No. 3,029,469                                April 17, 1962

Ralph F. Moore et al.

It is hereby certified that error appears in the above numbered patent requiring correction and that the said Letters Patent should read as corrected below.

Column 2, lines 49 and 50, for "inventtion" read -- invention --; column 10, line 13, for "of" read -- to --.

Signed and sealed this 14th day of August 1962.

(SEAL)
Attest:

ERNEST W. SWIDER
Attesting Officer

DAVID L. LADD
Commissioner of Patents